INVENTOR
E. E. DAVID, JR.
BY A. E. Hirsch Jr.
ATTORNEY

INVENTOR
E. E. DAVID, JR.
BY G. E. Hirsch Jr.
ATTORNEY

INVENTOR
E. E. DAVID, JR.
BY A. E. Hirsch Jr.
ATTORNEY

United States Patent Office 3,109,066
Patented Oct. 29, 1963

3,109,066

SOUND CONTROL SYSTEM

Edward E. David, Jr., Berkeley Heights, N.J., assignor to Bell Telephone Laboratories, Incorporated, New York, N.Y., a corporation of New York Filed Dec. 15, 1959, Ser. No. 859,684
8 Claims. (Cl. 179—1)

This invention relates to sound control systems and has for its principal object the improvement of intelligibility of information-bearing sounds emanating from a complex sound field.

In communication systems employing sound detectors or microphones located at a distance from information-bearing sound sources embedded in a complex noise field, the presence of environmental noise impairs the intelligibility of the information-bearing sounds by lowering the signal-to-noise ratio. Such systems include distant-talking telephone systems, radio and television broadcasting systems, motion picture recording systems, and high-quality sound recording systems. In the distant-talking telephone system of R. L. Hanson et al. Patent 2,736,771, granted February 28, 1956, intelligibility is improved by suppressing environmental noise. The Hanson system uses two microphones separated by a fraction of the wavelength of the sounds received, and environmental noise is suppressed by generating a control signal proportional to the difference of the microphone signals, and by using this control signal to depress the gain of the sum of the microphone signals. The ability of the Hanson system to improve intelligibility appears to be limited, since no control signal is generated unless the sound level of noise exceeds that of information-bearing sound. It is a specific object of the present invention to improve the intelligibility of information-bearing sounds in the presence of environmental noise regardless of relative sound levels.

It is a further object of this invention to increase the signal-to-noise ratio of information-bearing sounds and thereby to improve intelligibility by simultaneously reinforcing information-bearing sound signals and suppressing unwanted environmental noise signals. The operation of the present invention in simultaneously strengthening sounds from some sources and discriminating against sounds from other sources outwardly resembles the observed ability of human listeners to increase the signal-to-noise ratio by concentrating on speech from one talker and ignoring other talkers in the environment.

Reinforcement and suppression of sounds from particular sources are achieved in the present invention by using the envelopes of the signals produced by two spatially separated microphones to modulate or, more specifically, vary the amplitude of a combination of the microphone signals. In one form of the invention, the envelopes are nonlinearly combined, for example, multiplied, to form a modulating signal. Large amplitudes occur in the modulating signal when components in the two microphone signals representing sound from the same source are time-coincident. Time coincidence or synchronization is controlled by a delay device in one of the microphone leads before deriving the modulating signal. The amount of delay depends upon the spatial position of the sound source relative to the microphones. For sources located on the perpendicular bisector of the axis between the microphones, time coincidence occurs naturally, and the amount of delay required is zero. For sources located on extensions of the axis between the microphones, the delay is a maximum, the exact value depending upon the distance between the microphones and the velocity of sound propagation in the medium surrounding the microphones. By applying the modulating signal to increase the amplitude of a combination, for example, a sum, of the microphone signals in proper time synchrony, large amplitudes of the modulating signal coincide with and therefore reinforce those components in the combination which represent the same sound that gave rise to the large amplitudes in the modulating signal. Suppression of these components in the combination is achieved by reversing the polarity of the modulating signal before modulating the amplitude of the combination, thereby decreasing the amplitudes of these components. Simultaneous reinforcement and suppression of different components in the combination representative of sounds from different sources is accomplished by deriving a modulating signal of appropriate polarity for each component and by successively modulating the amplitude of the combination of the microphone signals with each modulating signal.

The invention will be more fully apprehended from the following detailed description of illustrative embodiments thereof taken in connection with the appended drawings, in which.

Figure 4A:
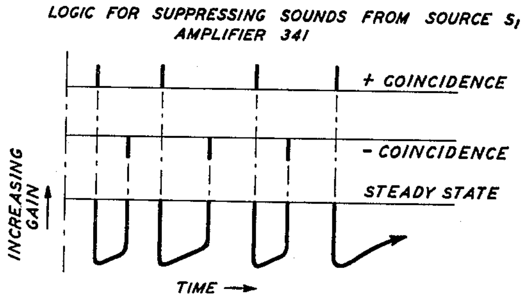
Figure 4B:
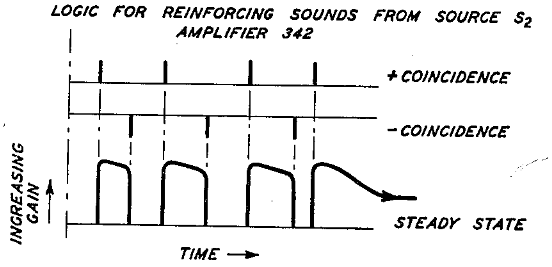
Figure 4C:
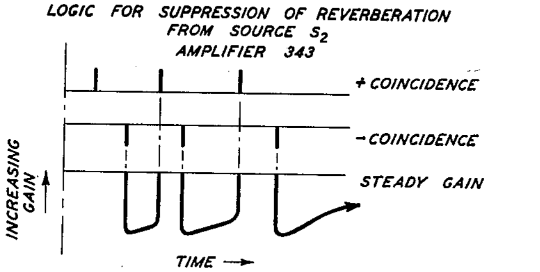
Figure 5A:
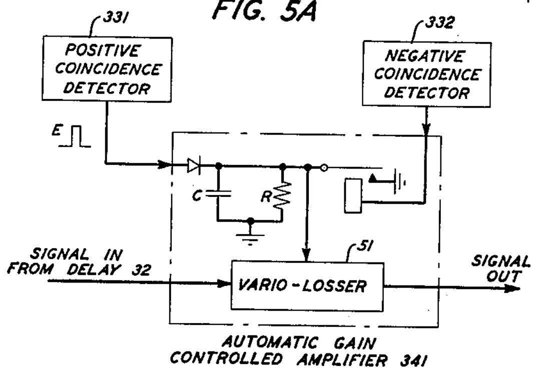
Figure 5B:
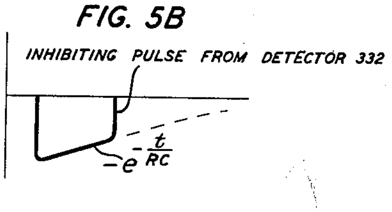
Figure 3:
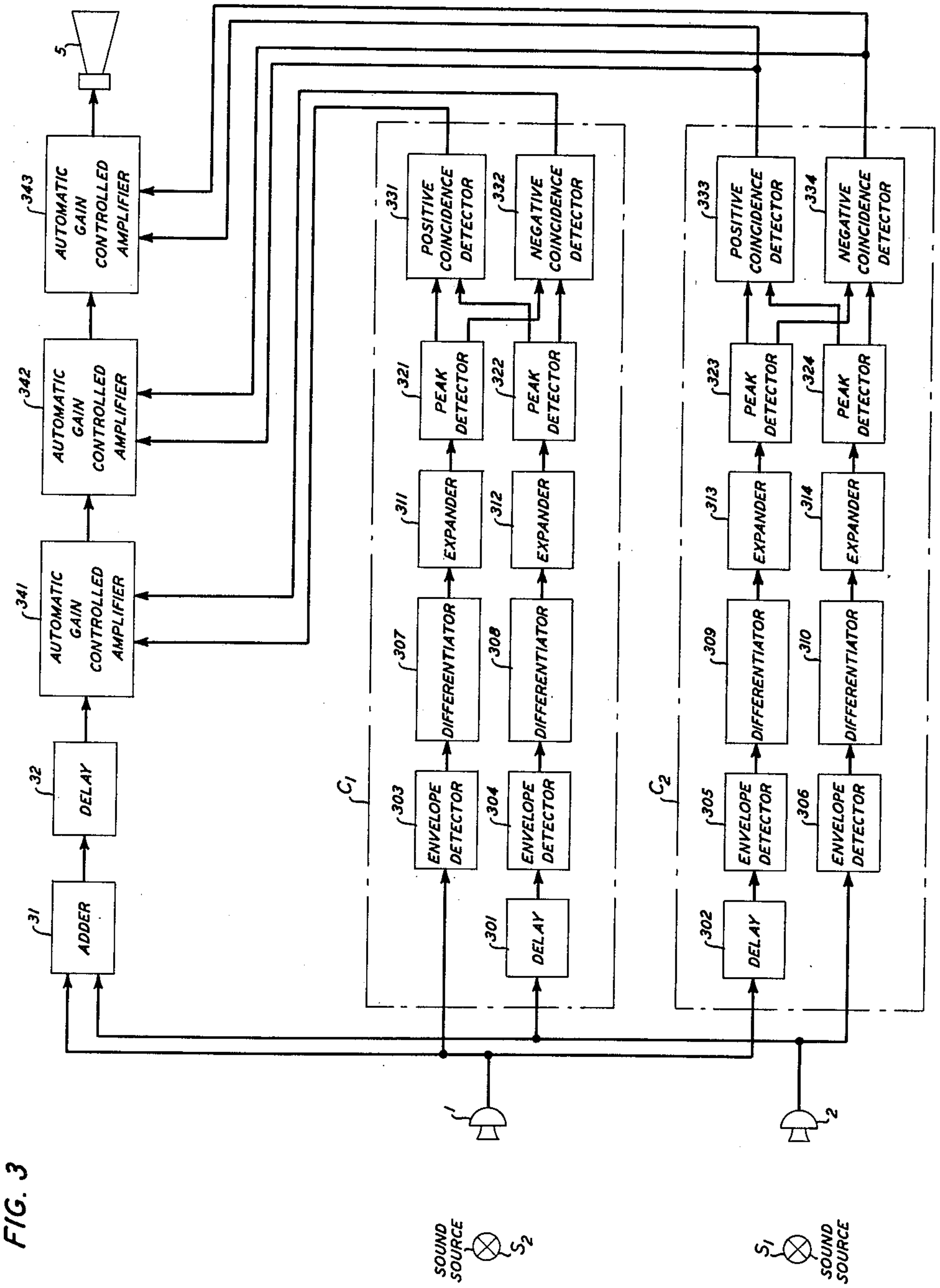
FIG. 3 is a schematic diagram of apparatus alternative to that of FIG. 1.

FIGS. 4A, 4B, and 4C are explanatory diagrams illustrating the mode of operation of apparatus shown in FIG. 3;

FIG. 5A is a schematic diagram of an automatic gain-controlled amplifier useful in implementing the apparatus of FIG. 3; and FIG. 5B is a waveform diagram of assistance in explaining the operation of the apparatus shown in FIG. 5A.

Figure 1:
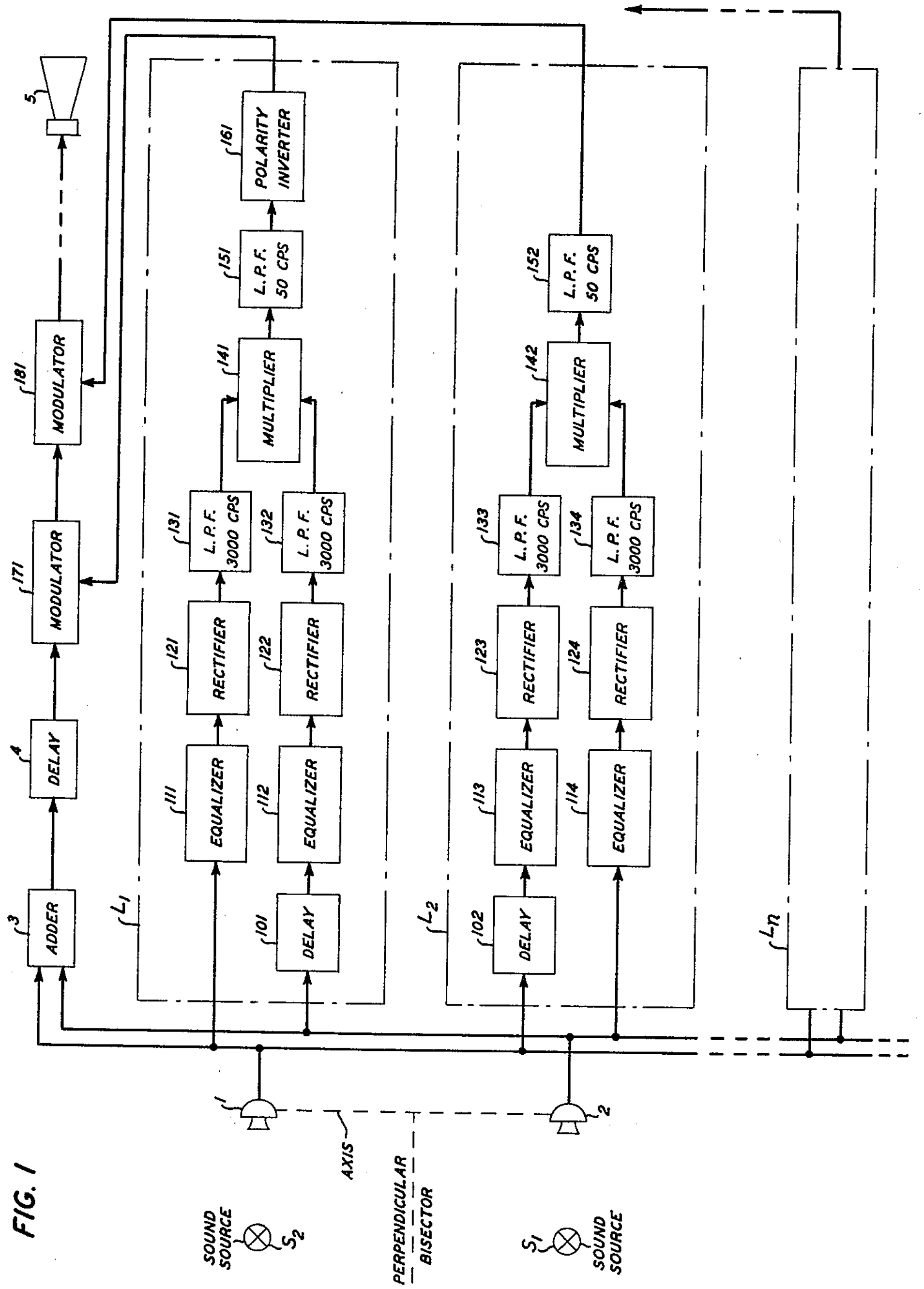
FIG. 1 is a schematic diagram showing a preferred form of apparatus in accordance with the invention.

Referring now to the drawing, FIG. 1 shows apparatus designed to reinforce sounds originating from source $S_2$ and to suppress sounds originating from source $S_1$. Sources $S_1$, $S_2$ are disposed at different positions relative to two spatially separated microphones 1, 2, which may be of any desired variety. Sounds originating from sources $S_1$, $S_2$ are converted into electrical signals by microphones 1 and 2 and the signals are transmitted to one or more circuits L, for example, circuits $L_1$ and $L_2$, connected in parallel.

Within circuit $L_1$ of FIG. 1, the signal from microphone 1 is first applied to equalizer 111, if desired, in order to pre-emphasize selected frequencies. The pre-emphasized signal is transmitted to rectifier 121 and low-pass filter 131 connected in series to obtain a measure of the envelope of the signal from microphone 1. The signal from microphone 2 in circuit $L_1$ is passed through delay 101 in order to synchronize the components in it representative of sound from source $S_1$ with the components in the signal from microphone 1 also representative of sound from source $S_1$. This delay is necessary since sound from source $S_1$ reaches microphone 2 before it reaches microphone 1. Either a fixed value delay element or a variable value delay element can be used for delay 101, depending upon whether source $S_1$ is in a fixed position or is mobile. The output of delay 101 is connected to equalizer 112, if desired, in order to pre-emphasize selected frequencies. A measure of the envelope of the delayed and pre-emphasized signal is then obtained by rectifier 122 and low-pass filter 132. The amount of filtering done by filters 131, 132 is limited by the necessity for preserving temporal detail in the signals. The time resolution of such detail is a function of the wavelength of the sound signals received, and is of the order of about 0.1 millisecond for audible sounds.

Figure 2:
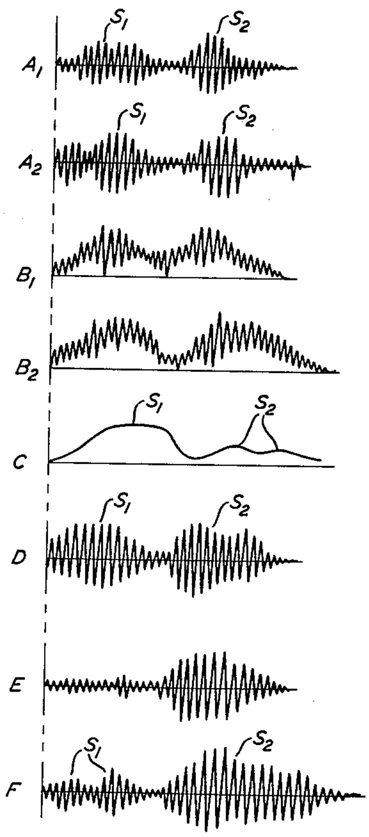
FIG. 2 is an explanatory diagram illustrating the mode of operation of apparatus shown in FIG. 1.

Curves $A_1$, $A_2$ of FIG. 2 show examples of the signals generated by microphones 1, 2, respectively, in response to typical sounds from sources $S_1$, $S_2$, and curves $B_1$, $B_2$ show the envelope signals derived by circuit $L_1$ from each of the microphone signals. Curve $B_1$ also illustrates how delay 101 synchronizes the component in the signal from microphone 2 representative of sound from source $S_1$ with the component in the signal from microphone 1 representative of sound from source $S_1$.

The two envelope signals derived within circuit $L_1$ of FIG. 1 are applied to multiplier 141, and the product signal thereby obtained is smoothed by low-pass filter 151 to form a modulating signal. Curve C of FIG. 2 illustrates the modulating signal and particularly the effect of multiplying the synchronized envelope signals and filtering the product signal: the large amplitude represents sound from source $S_1$; sound from source $S_2$ is represented by the much smaller amplitudes. Although FIG. 1 shows a multiplication of the two envelope signals in order to emphasize the characteristics of the components due to sound from source $S_1$, the invention is not limited to multiplication, since other non-linear combinations may be employed. The polarity of the modulating signal is inverted by polarity inverter 161, since signals originating from source $S_1$ are to be suppressed by the apparatus of FIG. 1, and the inverted polarity modulating signal from polarity inverter 161 is applied as a control signal to modulator 171, which, like modulator 181, may comprise a variable gain amplifier.

The two signals from microphones 1, 2 to be modulated are combined in adder 3, delayed by delay element 4, and the delayed sum of the two signals is applied to modulator 171. It is to be understood that the invention is not limited to applying a sum of the microphone signals as an input to modulator 171, but that some other combination of the signals may be used, if desired, as an input. Delay element 4 is employed to compensate for the delay caused by the various filter elements in the circuits L. The sum of the microphone signals before modulation is shown in curve D of FIG. 2, and curve E of FIG. 2 illustrates the output signal from modulator 171, in which it is noted that the amplitude of the component in curve D due to sound signals from $S_1$ is greatly reduced after passage through modulator 171, thereby suppressing that component. In order to reinforce the component in the output signal from modulator 171 due to sound signals from source $S_2$, the output terminal of modulator 171 is connected to modulator 181, whose operation is controlled by a modulating signal from circuit $L_2$ to increase the amplitude of the component due to sound signals from source $S_2$.

Turning to circuit $L_2$ of FIG. 1, the signal from microphone 1 is passed through delay 102 in order to synchronize the components of this signal representative of sound from source $S_2$ with the components of the signal from microphone 2 also representative of sound from source $S_2$. As in circuit $L_1$, delay 102 may be of either the fixed or variable variety. Selected frequencies of the delayed signal from microphone 1 are then pre-emphasized by equalizer 113, and the envelope of the pre-emphasized signal is derived by rectifier 123 and low-pass filter 133. Similarly, selected frequencies of the signal from microphone 2 are pre-emphasized by equalizer 114, and the envelope of the pre-emphasized signal is derived by rectifier 124 and low-pass filter 134. The two envelope signals thus derived are then multiplied in multiplier 142 and the product signal is smoothed by low-pass filter 152 to form a modulating signal. Since signals from source $S_2$ are to be reinforced, the modulating signal of circuit $L_2$ is not reversed in polarity.

The modulating signal from filter 152 is applied to modulator 181 in order to reinforce the component in the modulated sum from modulator 171 due to signals from source $S_2$ by increasing the amplitude of that component. The output signal produced by modulator 181, shown by curve F of FIG. 2, is applied to reproducer 5, for instance, a loudspeaker, and converted into audible sound.

It will be noted in curve F of FIG. 2 that the unwanted components from source $S_1$ are not completely suppressed by this apparatus, but nevertheless that the signal shown in curve F represents a net gain in signal-to-noise ratio of the component from source $S_2$, considering the $S_2$ component as the information-bearing signal and the $S_1$ component as noise. The net gain in signal-to-noise ratio is audible as an improvement in intelligibility of the component from source $S_2$ in the sound generated by reproducer 5 from the modulated combination of microphone signals.

In the apparatus of FIG. 1, the amplitude of the combination of the signals from microphones 1, 2 is shown modulated first by the signal from circuit $L_1$ applied to modulator 171 and then by the signal from circuit $L_2$ applied to modulator 181, but the order of modulation is reversible. In addition, the apparatus of FIG. 1 can be expanded to include an additional circuit, $L_n$, and associated modulator to control sound from a source other than $S_1$ or $S_2$. The additional circuit, $L_n$, is made to control sound from a particular source by the value of the delay employed in it, corresponding to delay 101 or 102, which creates the synchronization of sound components from that source in the microphone signals. For a source whose sound is to be suppressed, the circuit will contain a polarity inverter, as in circuit $L_1$; for a source whose sound is to be reinforced, the circuit will not contain a polarity inverter, as in circuit $L_2$. It is obvious that a plurality of circuits, $L_n$, and associated modulators can be added to the apparatus of FIG. 1 in order to control sound from a number of sources other than $S_1$ and $S_2$. Likewise, it is clear that the apparatus of FIG. 1 need not be used for simultaneous reinforcement and suppression, but that either reinforcement or suppression may be achieved by the elimination of either circuit $L_1$ or circuit $L_2$.

An alternative apparatus for obtaining a modulating signal to increase the signal-to-noise ratio is shown in FIG. 3. It utilizes rapid changes in the envelopes of the microphone signals to control one or more programmed amplifiers. FIG. 3 shows apparatus designed to reinforce sound received from source $S_2$, to suppress sound received from source $S_1$, and to suppress reverberant sound from sources $S_2$. Sources $S_1$, $S_2$ are disposed at different positions relative to two spatially separated microphones 1, 2. Sounds received from sources $S_1$, $S_2$, are converted into electrical signals by microphones 1, 2 and the signals are transmitted to circuits $C_1$, $C_2$ connected in parallel.

Within circuit $C_1$ of FIG. 3, the signal from microphone 1 is applied to envelope detector 303, which may comprise a rectifier and low-pass filter as in circuits $L_1$, $L_2$ of FIG. 1. The signal from microphone 2 is passed through delay 301 in order to bring the components in it representative of sound from source $S_1$ into synchrony with the components in the signal from microphone 1 representative of sound from source $S_1$. The delayed signal from microphone 2 is then passed to envelope detector 304, and the envelope signals derived by envelope detectors 303, 304 are transmitted to differentiators 307, 308, and then to amplitude expanders 311, 312, respectively, which may be of any well-known variety. The differentiators detect changes in the envelope signals indicative of either the onset or the termination of sound energy, and generate output signals whose positive peaks represent onsets and whose negative peaks represent terminations. The expanders emphasize the positive and negative peaks in the output signals before transmitting them to peak detectors 321, 322. Peak detectors 321, 322 pass the peaks to coincidence detectors 331, 332 in cross-coupled fashion. Positive coincidence detector 331 generates a pulse every time a positive peak from detector 321 coincides with a positive peak from detector 322. Negative coincidence detector 332 similarly generates a pulse every time two negative peaks coincide. Since coincidence in circuit $C_1$ occurs only for peaks representing sound from source $S_1$, the train of pulses generated by positive coincidence detector 331 indicates onsets of sound energy from source $S_1$, and the train of pulses generated by negative coincidence detector 332 indicates terminations of sound energy from source $S_1$. The two trains of pulses are used to control the gain of variable gain amplifier 341, for example, an automatic gain-controlled amplifier of the variety shown in FIG. 5A.

Amplifier 341 is also supplied with the combination of the signals from microphones 1, 2 produced by adder 31 and passed through delay 32. As in the apparatus of FIG. 1, a combination other than a sum of the two microphone signals may be used as an input to amplifier 341, and delay 32 compensates for the delay caused by the various filters in circuit $C_1$.

In automatic gain-controlled amplifier 341 shown in FIG. 5A, pulses from positive coincidence detector 331 depress the gain of the signal from delay 32 through vario-losser 51. The amount of loss through vario-losser 51 diminishes in accordance with the values of R and C, as shown in FIG. 5B, reaching a steady value after a suitable time interval. But a pulse from negative coincidence detector 332 during this time interval acts as an inhibiting pulse to bring the vario-losser back to a steady value immediately.

Amplifiers 342 and 343, which are connected in series with amplifier 341, are of the same basic design as amplifier 341; however, as shown in FIGS. 4A, 4B, and 4C, the three amplifiers are programmed differently, that is, each amplifier has a different response characteristic. FIG. 4A shows the logic for changing the gain of amplifier 341 in order to suppress those components in the sum of the microphone signals representing sound from source $S_1$. The first positive coincidence pulse from coincidence detector 331, indicating the onset of sound energy from source $S_1$, lowers the gain of amplifier 341 and thereby suppresses that component in the signal applied to the amplifier from delay 4 representing sound from source $S_1$. The following first negative coincidence pulse from coincidence detector 332, indicating the termination of sound energy from source $S_1$, brings the gain back to its steady value and ends the suppression. If a negative coincidence pulse does not follow a positive coincidence pulse, the amplifier gain relaxes automatically to its steady value with a suitable time-constant.

In circuit $C_2$ of FIG. 3, the signal from microphone 1 is first applied to delay 302 in order to synchronize the components representative of sound from source $S_2$ with the components in the signal from microphone 2 also representative of sound from source $S_2$. Envelope detectors 305, 306, differentiators 309, 310, expanders 313, 314, peak detectors 323, 324, and coincidence detectors 333, 334 operate on the delayed signal from microphone 1 and the undelayed signal from microphone 2 in the same fashion as their counterparts in circuit $C_1$ to produce two series of pulses. In circuit $C_2$, however, the sequence of pulses generated by positive coincidence detector 333 indicates onsets of sound energy from source $S_2$, and the sequence of pulses generated by negative coincidence detector 334 indicates terminations of sound energy from source $S_2$. The two sequences of pulses change the gain of amplifier 342 to reinforce components in the signal from amplifier 341 representing sound from source $S_2$, in accordance with the logic shown in FIG. 4B. The first positive coincidence pulse from coincidence detector 333 raises the gain of amplifier 342 and thereby reinforces that component in the amplifier input signal representing sound from source $S_2$. The following first negative coincidence pulse from coincidence detector 334 lowers the amplifier gain to its steady value and ends the reinforcement. If a negative coincidence pulse does not follow a positive concidence pulse, the amplifier gain relaxes automatically to its steady value with a suitable time-constant.

To increase still further the signal-to-noise ratio and further to improve the intelligibilty of sound received by the apparatus of FIG. 3 from source $S_2$, reverberant sound from source $S_2$ is suppressed by amplifier 343, programmed in accordance with the logic shown in FIG. 4C. Since the reverberant sound from source $S_2$ always follows the original sound from source $S_2$, the unwanted sound to be suppressed is the "tail" of the reverberant sound, that is, the portion of the reverberant sound which continues after the original sound has terminated. The gain of amplifier 343, therefore, is changed according to the logic shown in FIG. 4C. The first positive coincidence pulse from coincidence detector 333 of circuit $C_2$, indicating the onset of sound energy from source $S_2$ in the output signal from amplifier 342, does not change the gain of amplifier 343, since this sound energy, representing reinforced information-bearing signals, is to be passed unchanged. But the following negative coincidence pulse from coincidence detector 334 of circuit $C_2$, indicating the termination of sound energy from source $S_2$, causes the gain to be lowered, thereby suppressing that component in the sum of the microphone signals representing the "tail" of the reverberant sound. The next positive coincidence pulse from circuit $C_2$, indicating the onset of sound energy from source $S_2$, brings the gain of amplifier 343 back to its steady value. If a negative pulse is not followed by a positive pulse, the gain relaxes to its steady value with a suitable time-constant.

Sound is reproduced from the output signals of amplifier 343 by reproducer 5, for example, a loudspeaker. The intelligibility of sound from source $S_2$ in the reproduced sound is improved by virtue of the increase in its signal-to-noise ratio, achieved by reinforcing sound from source $S_2$ (the "signal"), and by suppressing sound (the "noise") from source $S_1$, and reverberant sound (the "noise") from source $S_2$.

It is to be understood that the above-described arrangements are merely illustrative of applications of the principles of the invention. Numerous other arrangements may be devised by those skilled in the art without departing from the spirit and scope of the invention.

What is claimed is:

1. In a system for the control of sound, a plurality of means situated at different locations for detecting sounds, means for combining the output signals of said detecting means, means connected in parallel with said combining means for synchronizing selected components of the output signal of one of said sound-detecting means with similar components of the output signals of the other sound-detecting means, means for deriving a measure of the envelopes of said synchronized output signals to form control signals, and modulating means responsive to said control signals for selectively varying the amplitude of the output signal of said combining means.

2. Apparatus for increasing the signal-to-noise ratio of information-bearing sound signals received from a complex sound field, comprising two spatially separated microphones, means for combining the signals generated by said microphones, first means connected in parallel with said combining means for synchronizing the unwanted sound components of the output signal of one of said microphones with the unwanted sound components of the output signal of the other microphone to form a first pair of synchronized signals, second means connected in parallel with said combining means for synchronizing the information-bearing components of the output signal of one of said microphones with the information-bearing components of the output signal of the other microphone to form a second pair of synchronized signals, means for nonlinearly combining the envelopes of said first pair of synchronized signals to form a first control signal, means for nonlinearly combining the envelopes of said second pair of synchronized signals to form a second control signal, first modulating means responsive to said first control signal for reducing the amplitudes of the unwanted sound components of the output signal of said combining means, and second modulating means responsive to said second control signal for increasing the amplitudes of the information-bearing components of the output signal of said first modulating means.

3. Apparatus for improving the intelligibility of speech originating from a source located in a noisy environment, comprising two microphones located at different positions in the environment, means for additively combining the output signals of said microphones, first means connected in parallel with said additive combining means for synchronizing the noise components of the output signal of one of said microphones with the noise components of the other microphone to form a pair of noise-synchronized microphone signals, second means connected in parallel with said additive combining means for synchronizing the speech components of the output signal of one of said microphones with the speech components of the output signal of the other microphone to form a pair of speech-synchronized microphone signals, means for obtaining the envelopes of said pair of noise-synchronized microphone signals to form a first pair of envelope signals, comprising the tandem combination of a rectifier and a low-pass filter, means for obtaining the envelopes of said pair of speech-synchronized microphone signals to form a second pair of envelope signals, comprising the tandem combination of a rectifier and a low-pass filter, means for obtaining the product of said first pair of envelope signals to form a first control signal, means for obtaining the product of said second pair of envelope signals to form a second control signal, means for inverting the polarity of said first control signal, first modulating means responsive to said inverted polarity first control signal for suppressing the noise component of the output signal of said additive combining means, second modulating means responsive to said second control signal for reinforcing the speech component of the output signal of said suppressing means, and means for converting the output signal of said reinforcing means into audible sounds whereby the signal-to-noise ratio of the speech component is increased.

4. In a system for the control of sound, means for detecting sounds at a plurality of different locations within a sound field, means for combining the output signals of said sound-detecting means, means connected in parallel with said combining means for obtaining signals representing the individual envelopes of the output signals of said sound-detecting devices, means for detecting time-coincident changes of like polarity in said envelope signals to form a pair of control signals, one of said pair of control signals representing time-coincident positive changes in said envelope signals, and the other of said pair of control signals representing time-coincident negative changes in said envelope signals, and means responsive to said pair of control signals for selectively varying the energy of the output signal of said combining means.

5. In a system for the control of sound, the combination of means for detecting the intensity of sounds at two spatially separated positions, means for combining the output signals produced by said detecting means, a plurality of means connected in parallel with said combining means for generating a plurality of pairs of control signals, wherein each of said means for generating a control signal comprises a pair of means for synchronizing selected components of the output signal of one of said detecting means with similar components of the output signal of the other detecting means, means for deriving a pair of envelope signals proportional to the individual envelopes of said pair of synchronized output signals, and means for detecting energy changes in said pair of envelope signals to form a pair of control signals, and a plurality of serially connected automatic gain controlled amplifiers each of which is responsive to said pairs of control signals for selectively adjusting the amplitude of the output signal of said combining means.

6. Apparatus for increasing the signal-to-noise ratio of information-bearing sound signals received from a complex sound field, comprising two spatially separated microphones, means for combining the signals generated by said microphones, means for synchronizing the unwanted sound components of the output signal of one of said microphones with the unwanted sound components of the output signal of the other microphone to form a first pair of synchronized signals, means connected in parallel with said combining means for synchronizing the information-bearing components of the output signal of one of said microphones with the information-bearing components of the output signal of the other microphone to form a second pair of synchronized signals, means for deriving signals representative of the envelopes of said first pair of synchronized signals, means for deriving signals representative of the envelopes of said second pair of synchronized signals, means for detecting changes in said first pair of envelope signals to form a first pair of control signals, means for detecting changes in said second pair of envelope signals to form a second pair of control signals, a first modulating means responsive to said first pair of control signals for reducing the amplitudes of unwanted components of the output signal of said combining means, a second modulating means responsive to said second pair of control signals for increasing the amplitudes of the information-bearing components of the output signal of said first modulating means, and means for converting the output signal of said second modulating means into audible sounds, whereby the signal-to-noise ratio of the speech component is increased.

7. In a distant-talking two-way telephone system, the combination of two microphones for detecting sounds at different positions within the subscriber's location, means for converting an incoming telephone signal into sound energy, means for combining the output signals of said microphones, modulator means comprising two variable gain amplifiers connected in series for transmitting said combined output signals as an outgoing telephone signal, means for nonlinearly combining selected time-coincident components of the envelopes of said microphone signals to form two control signals, the first control signal being representative of sound received from the subscriber, and the second control signal being representative of sound received from said converting means, means for raising the gain of said first amplifier by said first control signal, and means for depressing the gain of said second amplifier by said second control signal, whereby the signal-to-noise ratio of components of the outgoing signals representing voice sounds of the subscriber is increased.

8. In a distant-talking two-way telephone system, the combination which comprises two spatially separated microphones for detecting sounds at the subscriber's station, means for converting an incoming telephone signal into sound energy, means for combining the output signals of said microphones, modulator means comprising two variable gain amplifiers connected in series for transmitting said combined output signals as an outgoing telephone signal, a first means including a delay device for obtaining the smoothed product of the envelopes of said microphone signals to form a first control signal, said delay device so proportioned to create time coincidence for components in said microphone signals representing sound from said converting means, a second means including a delay device for obtaining the smoothed product of the envelopes of said microphone signals to form a second control signal, said delay device so proportioned to create time coincidence for components in said microphone signals representing sound from said subscriber location, means for depressing the gain of said first amplifier by said first control signal, and means for raising the gain of said second amplifier by said second control signal, whereby components of said outgoing signal representing voice sounds of said subscriber are reinforced while components of said outgoing signal representing sounds originating from said converting means are suppressed.

References Cited in the file of this patent

UNITED STATES PATENTS

| | | |
|---|---|---|
| 2,098,561 | Beers | Nov. 9, 1937 |
| 2,336,880 | Mitchell | Dec. 14, 1943 |
| 2,343,471 | Nixon | Mar. 7, 1944 |
| 2,698,379 | Boelens et al. | Dec. 28, 1954 |
| 2,817,711 | Feldman | Dec. 24, 1957 |
| 2,953,644 | Miller | Sept. 20, 1960 |